(12) United States Patent
Lee (10) Patent No.: US 8,415,844 B2
(45) Date of Patent: Apr. 9, 2013

(54) BASE ASSEMBLY FOR MOTOR WITH PULLING PLATE AND ADHESIVE FILLING PART AND MOTOR INCLUDING THE SAME

(75) Inventor: Ta Kyoung Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/064,155

(22) Filed: Mar. 8, 2011

(65) Prior Publication Data

US 2012/0153761 A1    Jun. 21, 2012

(30) Foreign Application Priority Data

Dec. 21, 2010    (KR) .................. 10-2010-0131702

(51) Int. Cl.
*H02K 7/00*        (2006.01)
*H02K 7/08*        (2006.01)
*G11B 19/20*     (2006.01)

(52) U.S. Cl.
USPC ....... 310/67 R; 310/90; 360/98.07; 360/99.08

(58) Field of Classification Search ................ 310/67 R, 310/90; 360/99.08, 98.07
See application file for complete search history.

(56) References Cited

U.S. PATENT DOCUMENTS

2009/0174272 A1    7/2009  Yoneda et al.
2010/0142359 A1    6/2010  Sakata et al.
2011/0069416 A1    3/2011  Kang
2011/0134566 A1*   6/2011  Sekii et al. ................ 360/99.08

FOREIGN PATENT DOCUMENTS

| JP | 2008-187854 | 8/2008 |
| JP | 2009-5561 | 1/2009 |
| JP | 2010-081708 | 4/2010 |
| JP | 2010081708 A * | 4/2010 |
| JP | 2010-136575 | 6/2010 |
| KR | 10-1053317 | 7/2011 |

OTHER PUBLICATIONS

Machine Trnaslation JP2010081708 (2010).*
Korean Office Action dated Dec. 5, 2011 issued in corresponding Korean Patent Application No. 10-2010-0131702.
Japanese Office Action for corresponding Japanese application No. 2011-046383 issued Dec. 25, 2012.

* cited by examiner

*Primary Examiner* — Tran Nguyen
*Assistant Examiner* — Jose Gonzalez Quinones (57) ABSTRACT

There is provided a base assembly for a motor, including: a base member having a shaft system of the motor mounted therein; a pulling plate bonded to the base member to prevent excessive floating of the motor; and at least one adhesive filling part formed in the pulling plate, and providing an adhesion space for an adhesive used for bonding the pulling plate to the base member to increase a contact area with the adhesive.

6 Claims, 6 Drawing Sheets

BASE ASSEMBLY FOR MOTOR WITH PULLING PLATE AND ADHESIVE FILLING PART AND MOTOR INCLUDING THE SAME

CROSS-REFERENCE TO RELATED APPLICATIONS

This application claims the priority of Korean Patent Application No. 10-2010-0131702 filed on Dec. 21, 2010, in the Korean Intellectual Property Office, the disclosure of which is incorporated herein by reference.

BACKGROUND OF THE INVENTION

1. Field of the Invention

The present invention relates to a base assembly for a motor and a motor including the same, and more particularly, to a base assembly for a motor improving the performance thereof by improving the unmating force of a pulling plate, and a motor including the same.

2. Description of the Related Art

A hard disk drive (HDD), one of various computer information storage devices, reproduces data stored on a disk or records data thereon using a magnetic head.

In the hard disk drive, a base member has a head driver, that is, a head stack assembly (HSA) installed to move the magnetic head across the disk. The magnetic head performs a function thereof, while being moved to a desired position in a state in which it is positioned at a predetermined height from a recoding surface of the disk by the head driver.

In addition, the hard disk drive requires a disk driving apparatus capable of driving the disk. As the disk driving apparatus, a compact spindle motor is used.

The compact spindle motor includes a rotating member and a fixed member, has a structure in which the rotating member rotates with respect to the fixed member, and requires a predetermined floating force for the rotation of the rotating member.

However, when an excessive force larger than the floating force required for the rotation of the rotating member is generated, the rotating member is not rotated normally or is separated from the fixed member to thereby cause a fatal result in terms of performance.

In order to solve the problem, the pulling plate having an attraction to a magnet mounted on the motor has been coupled to the base member to prevent the excessive floating of the rotating member. However, the pulling plate according to the related art had weak unmating force to cause a problem in which it could be separated from the base member even due to a small external impact.

Accordingly, research into maximizing the performance and lifespan of the spindle motor by improving the unmating force of the pulling plate so as to prevent the excessive floating of the rotating member has been urgently demanded.

SUMMARY OF THE INVENTION

An aspect of the present invention provides a base assembly for a motor that can improve the performance and lifespan thereof by maximizing the unmating force of a pulling plate so as to prevent the excessive floating of a rotating member, and a motor including the same.

According to an aspect of the present invention, there is provided a base assembly for a motor, the base assembly including: a base member having a shaft system of the motor mounted therein; a pulling plate bonded to the base member to prevent excessive floating of the motor; and at least one adhesive filling part formed in the pulling plate, and providing an adhesion space for an adhesive used for bonding the pulling plate to the base member to increase a contact area with the adhesive.

The base member may include a step part stepped on one surface thereof corresponding to a magnet generating a rotational driving force of the motor, and the pulling plate may include an upper part bonded to an upper surface of the step part and an extension part extended from an end of the upper part to a side surface of the step part.

The adhesive filling part may be formed in the extension part, and may be recessed from an outer circumferential surface of the extension part to provide the adhesion space for the adhesive.

The adhesive filling part may be continuously or discontinuously formed along the outer circumferential surface of the extension part.

The adhesive filling part may be formed to penetrate the extension part through inwardly of an outer circumferential surface thereof in a radial direction to provide the adhesion space for the adhesive.

The adhesive filling part may be extended to a lower surface of the extension part.

The adhesive filling part may include a first coupling hole and a second coupling hole having a width narrower than that of the first coupling hole, and the second coupling hole may be extended to the lower surface of the extension part.

The adhesive filling part may have a gradually reduced width toward the lower surface of the extension part.

The adhesive filling part may protrude outwardly of one end of the upper part in a radial direction to increase the contact area with the adhesive.

The upper part may include an auxiliary adhesive filling part recessed upwardly of a lower surface thereof in order to increase adhesion between the pulling plate and the base member by providing a filling space for the adhesive.

According to another aspect of the present invention, there is provided a motor including: the base assembly for the motor as described above; a core coupled to a base member and having a coil wound therearound, the coil generating a rotational driving force; and a hub coupled to a shaft system and including a magnet disposed to correspond to the coil.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 1:
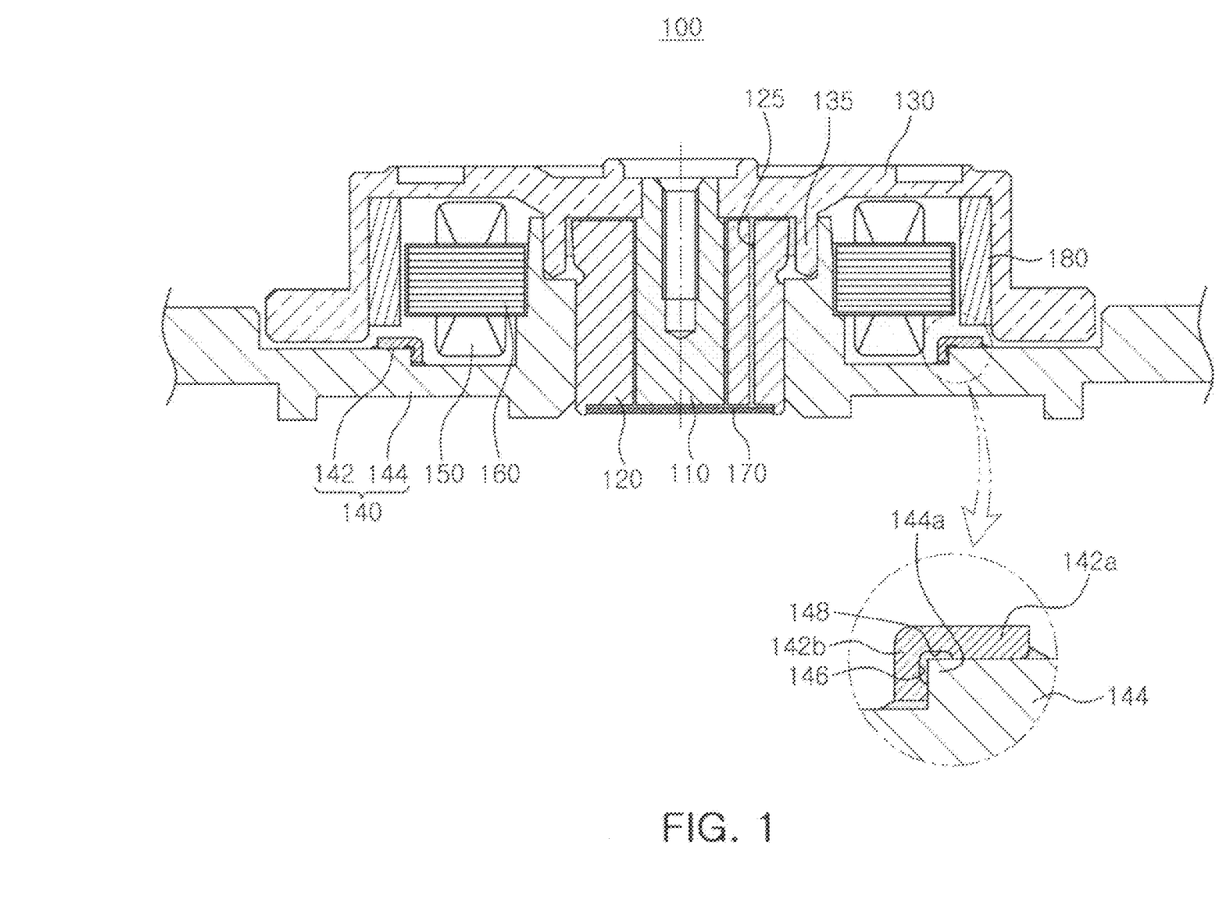
FIG. 1 is a cross-sectional view schematically showing a motor according to an exemplary embodiment of the present invention.

FIG. 1 is a cross-sectional view schematically showing a motor according to an exemplary embodiment of the present invention.

Referring to FIG. 1, a motor 100 according to an exemplary embodiment of the present invention may include a sleeve 120 supporting a shaft 110, a hub 130, and a base assembly 140 for a motor.

First, terms used herein associated with directions will now be defined. As viewed in FIG. 1, an axial direction refers to a vertical direction based on the shaft 110, and an outer or inner radial direction refers to a direction towards an outer edge of the hub 130 based on the shaft 110 or a central direction of the shaft 110 based on the outer edge of the hub 130.

The sleeve 120 is a fixed member that is coupled to a base member 144, into which a core 160 to be described below is fixedly inserted, and supports the shaft 110.

In this configuration, the sleeve 120 may support the shaft 110 such that an upper end of a shaft 110 protrudes upwardly in the axial direction and may be formed by forging Cu or Al or sintering Cu—Fe-based alloy powder or SUS-based power.

The sleeve 120 may include a circulation hole 125 formed such that an upper portion of the sleeve 120 is in communication with a lower portion thereof. The circulation hole 125 may disperse the pressure of oil filling an inner portion of the motor 100 to maintain a balance thereof, and may move air bubbles, or the like, existing in the inner portion of the motor 100 so as to be discharged by circulation.

In this configuration, a cover plate 170 may be coupled to the lower portion of the sleeve 120 in the axial direction, having a clearance therebetween, wherein the clearance receives the oil.

The oil is received in the clearance between the cover plate 170 and the sleeve 120, thereby serving as a bearing supporting a lower surface of the shaft 110.

In this configuration, the oil may be continuously filled in a clearance between the shaft 110 and the sleeve 120, in a clearance between the hub 130 and the sleeve 120, and in a clearance between the cover plate 170 and the sleeve 120 to thereby form a full-fill structure.

The hub 130 may be a rotating structure rotatably provided with respect to the base member 144, and may include a ring-shaped magnet 180 formed in an inner circumferencial surface thereof, the ring-shaped magnet 180 being disposed to correspond to the core 160 having a predetermined interval therebetween.

In addition, the hub 130 may allow oil to be sealed between the hub 130 and an upper portion of the outer surface of the sleeve 120, and may include a main wall part 135 extended downwardly in the axial direction for oil sealing.

That is, the main wall part 135 may protrude from one surface of the hub 130, which is the rotating member, such that the oil is to be sealed between the main wall part 135 and the sleeve 120, which is the fixed member. The main wall part 135 may be extended along the outer surface of the sleeve 120 such that an oil interface may be formed between the main wall part 135 and the upper portion of the outer surface of the sleeve 120.

The base assembly 140 for a motor may include the base member 144 and a pulling plate 142, which may be fixed members.

The base member 144 is the fixed member having an insertion hole formed therein, and the insertion hole may include a shaft system including the above-mentioned shaft 110 and sleeve 120 mounted therein.

In addition, the base member 144 may be connected to a core 160 having a coil 150 wound therearound, the coil generating electromagnetic force having a predetermined magnitude when power is applied thereto. The core 160 may be fixedly disposed on the upper portion of the base member 144 including a printed circuit board (not shown) having circuit patterns printed thereon.

In this configuration, a plurality of coil holes having a predetermined size may be formed to penetrate an upper surface of the base member 144 corresponding to the coil 50 to thereby allow the coil 50 to be exposed downwardly. The coil 150 may be electrically connected to the printed circuit board (not shown) such that external power is supplied thereto.

In addition, the base member 144 may include a step part 144a such that the pulling plate 142 is bonded thereto.

In this configuration, the step part 144a may be formed on a surface corresponding to the magnet 180 disposed on the hub 130, and upper and side surfaces of the step part 144a may be bonded to an upper part 142a and an extension part 142b of the pulling plate 142, respectively, by an adhesive.

The pulling plate 142, which is a component having attraction to the magnet 180 coupled to the hub 130, may prevent excessive floating of the rotating member including the shaft 110 and the hub 130.

In this configuration, the shaft 110 and the hub 130, which are the rotating members of the motor 100 according to an exemplary embodiment of the present invention, should be floated by a predetermined height for stable rotation; however, in the case in which the shaft 110 and the hub 130 are excessively floated above a previously designated floating height, it may have a negative effect on performance.

In this case, in order to prevent the excessive floating of the shaft 110 and the hub 130, which are the rotating members, the pulling plate 142 may be bonded to the step part 144a of the base member 144. The excessive floating of the rotating member may be prevented due to attraction between the pulling plate 142 and the magnet 180.

The pulling plate 142 may be made of a ferromagnetic substance capable of being magnetized by the magnet 180. As the ferromagnetic substance, there may be iron (Fe), nickel (Ni), cobalt (Co), or an alloy thereof.

In this configuration, the pulling plate 142 may include at least one adhesive filling part 146 providing an adhesion space for an adhesive used for bonding the pulling plate 142 to the step part 144a of the base member 144 to increase a contact area with the adhesive.

In addition, the pulling plate 142 may include an auxiliary adhesive filling part 148 together with the adhesive filling part 146 or may include only an adhesive filling part 148.

The adhesive filling part 146 and the auxiliary adhesive filling part 148 will be described with reference to FIGS. 2 and 3.

Figure 2:
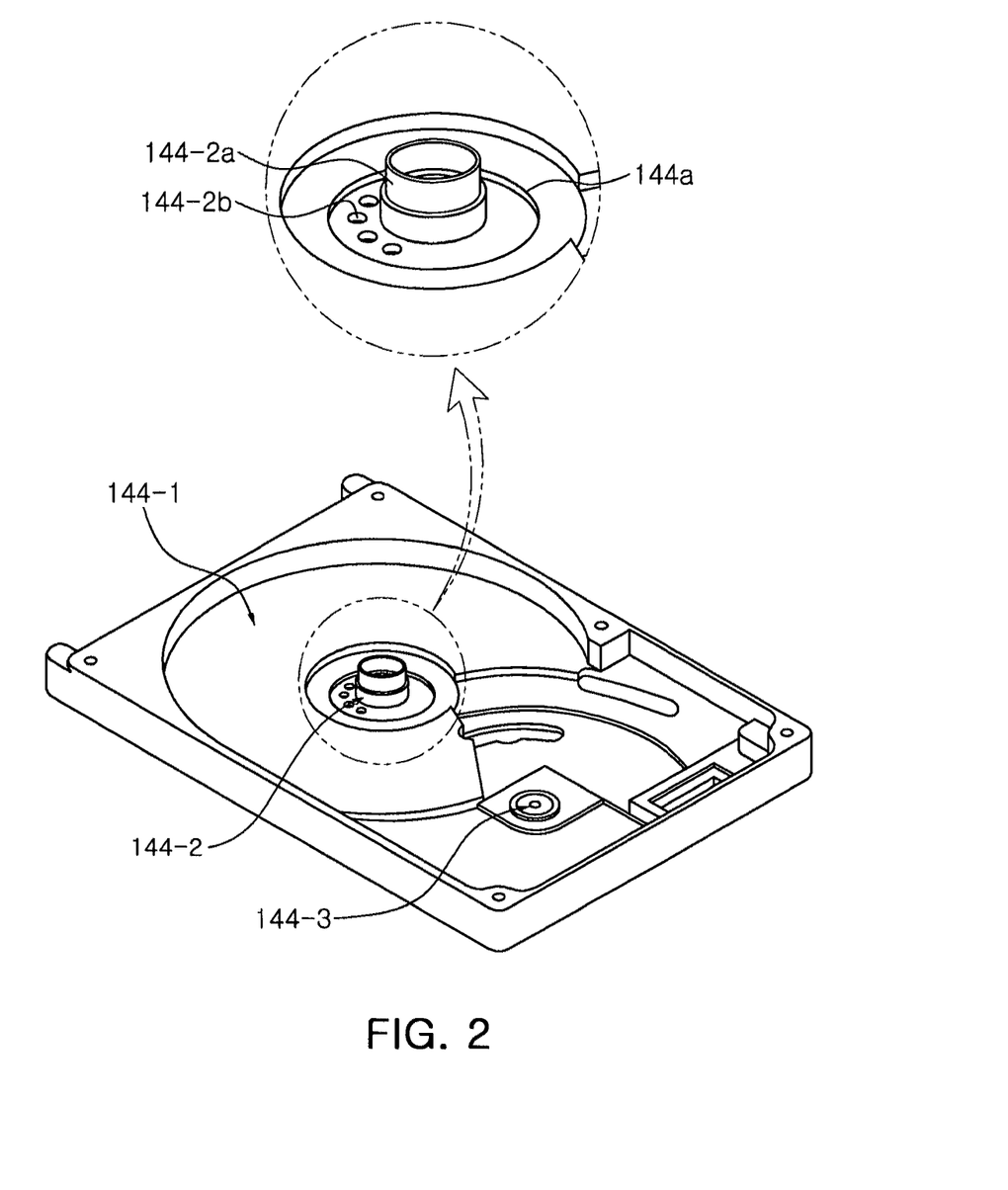
FIG. 2 is a perspective view schematically showing a base member provided in a motor according to an exemplary embodiment of the present invention.
Figure 3:
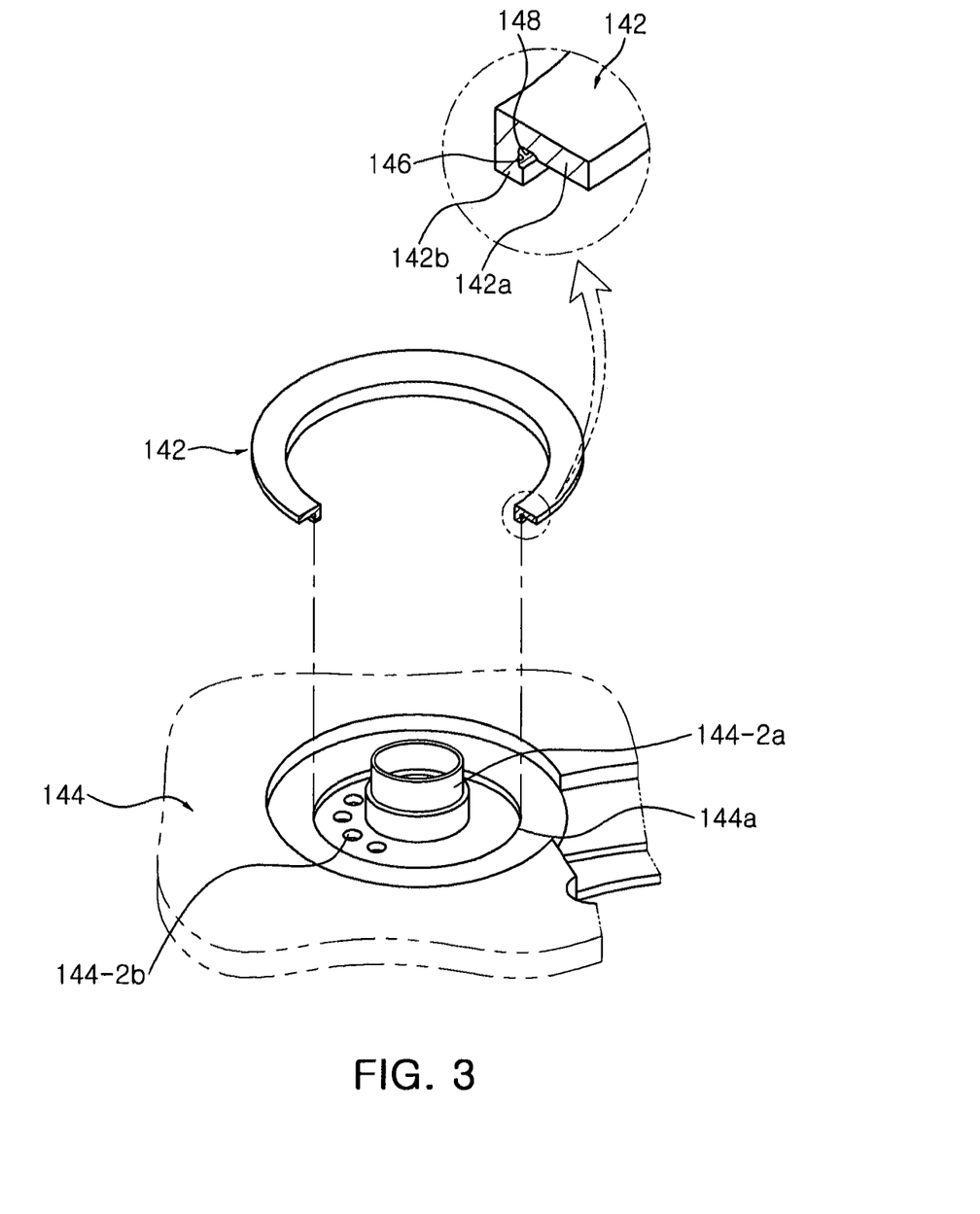
FIG. 3 is a perspective view schematically showing a coupling relationship between a base member and a pulling plate provided in a motor according to an exemplary embodiment of the present invention.

FIG. 2 is a perspective view schematically showing a base member provided in a motor according to an exemplary embodiment of the present invention, and FIG. 3 is a perspective view schematically showing a bonding relationship between a base member and a pulling plate provided in a motor according to an exemplary embodiment of the present invention.

Referring to FIG. 2, the base member 144 provided in the motor 100 according to an exemplary embodiment of the present invention may include a disk disposition part 144-1, a motor seating part 144-2, and a head seating part 144-3.

The disk disposition part 144-1, which is the part on which a disk to be coupled to the motor 100 is disposed, may have a disk disposed on an upper portion thereof, wherein the disk has data stored therein.

The motor seating part 144-2 may be formed at the center of the disk disposition part 144-1. The motor seating part 144-2 may include a protrusion part 144-2a having a hollow such that the sleeve 120 and the core 160 having the coil 150 wound therearound may be coupled thereto.

The motor seating part 144-2 may have at least one coil hole 144-2b allowing a lead wire of the coil 50 to pass therethrough, and the coil 150 led-out through the coil hole 144-2b may be connected to an external printed circuit board (not shown).

The motor seating part 144-2 may include the step part 144a stepped from one surface corresponding to the magnet coupled to one surface of the hub 130 of the motor 100, and the upper and side surfaces of the step part 144a may be bonded to the pulling plate 142 by the adhesive.

In this configuration, the head seating part 144-3 may be adjacent to the disk disposition part 144-1, and may be coupled to a head driver (not shown) that reproduces the data stored in the disk.

Referring to FIG. 3, the pulling plate 142 provided in the motor 100 according to an exemplary embodiment of the present invention may include an upper part 142a, an extension part 142b, and an adhesive filling part 146.

In other words, the pulling plate 142 may include the upper part 142a bonded to the upper surface of the step part 144a formed in the motor seating part 144-2 and the extension part 142b extended from an end of the upper part 142a to the side surface of the step part 144a.

In this configuration, the pulling plate 142 may be continuously formed in the circumference direction so as to correspond to the magnet 180 coupled to the hub 130 of the motor 100.

In addition, the extension part 142b of the pulling plate 142 may include the adhesive filling part 146 being recessed inwardly of an outer circumferential surface of the extension part 142b in the radial direction in order to secure an adhesion space, that is, a filling space for the adhesive.

The adhesive filling part 146 may be recessed to have a depth smaller than the thickness of the extension part 142b, and may be continuously formed along the outer circumferential surface of the extension part 142b.

In addition, the adhesive filling part 146 may be formed at any position of the extension part 142b, and may be formed at a border between the extension part 142b and the upper part 142a.

Accordingly, owing to the adhesive filling part 146 formed in the extension part 142b of the pulling plate 142, the filling space for the adhesive used to bond the pulling plate 142 to the base member 144 may be secured, and the adhesive filling the adhesive filling part 146 may serve as a wedge protruding from the base member 144 to increase the unmating force of the pulling plate 142.

In this configuration, the pulling plate 142 may include the auxiliary adhesive filling part 148 together with the adhesive filling part 146, and the auxiliary adhesive filling part 148 may be formed on a lower surface of the upper part 142a.

That is, the auxiliary adhesive filling part 148, which is a groove for increasing the filling space for the adhesive together with the adhesive filling part 146, may be formed by allowing the lower surface of the upper part 142a to be recessed upwardly.

In addition, the auxiliary adhesive filling part 148 may be continuously or discontinuously formed along the lower surface of the upper part 142a.

FIGS. 4 through 8 are perspective views schematically showing modified examples of a pulling plate provided in a motor according to an exemplary embodiment of the present invention.

The pulling plate 142 shown in FIGS. 4 through 8 may include the upper part 142a, the extension part 142b, and the adhesive filling part 146a-146e, similar to that of the above-mentioned exemplary embodiment.

Figure 4:
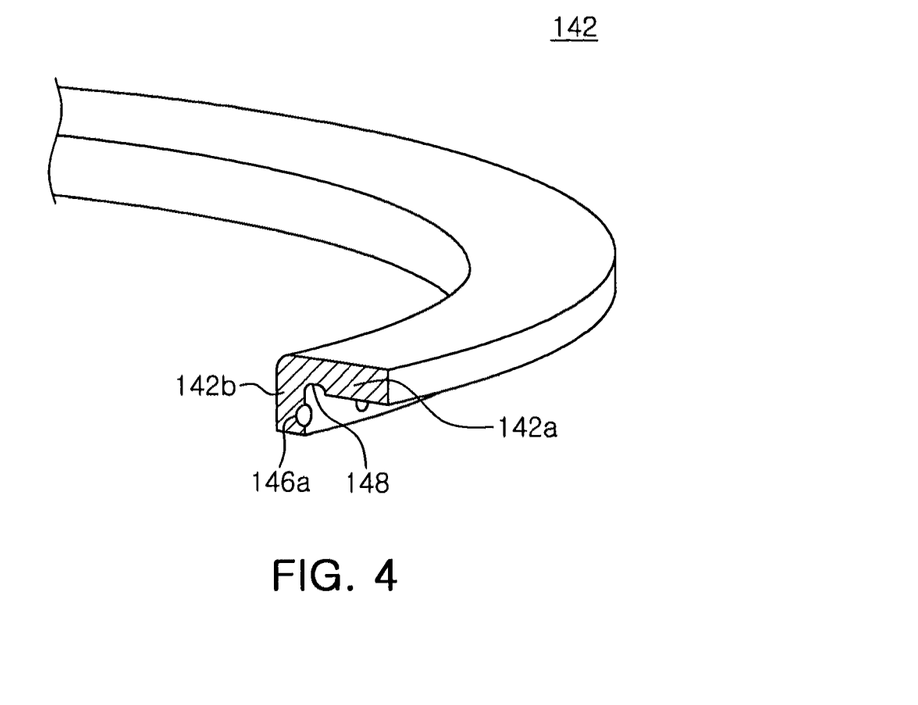
FIGS. 4 through 8 are perspective views schematically showing modified examples of a pulling plate provided in a motor according to an exemplary embodiment of the present invention.

Referring to FIG. 4, the adhesive filling part 146a formed in the extension part 142 of the pulling plate 142 may be recessed inwardly of the outer circumferential surface of the extension part 142b in the radial direction in order to secure an adhesion space for an adhesive.

Unlike the above-mentioned exemplary embodiment, the adhesive filling part 146a may be discontinuously formed, and the number thereof is not particularly limited.

In addition, the shape of the adhesive filling part 146a may be at least one of a circular shape, an oval shape, a rectangular shape, and a triangular shape; however, the shape of the adhesive filling part 146a is not limited thereto. The shape of the adhesive filling part 146a may be modified so long as it has a structure in which the adhesive filling the adhesive filling part 146a may serve as a wedge protruding from the base member 144 to increase the unmating force of the pulling plate 142.

In addition, the adhesive filling part 146a may be formed to have a depth smaller than the thickness of the extension part 142b, and may be formed at any position of the extension part 142b.

Figure 5:
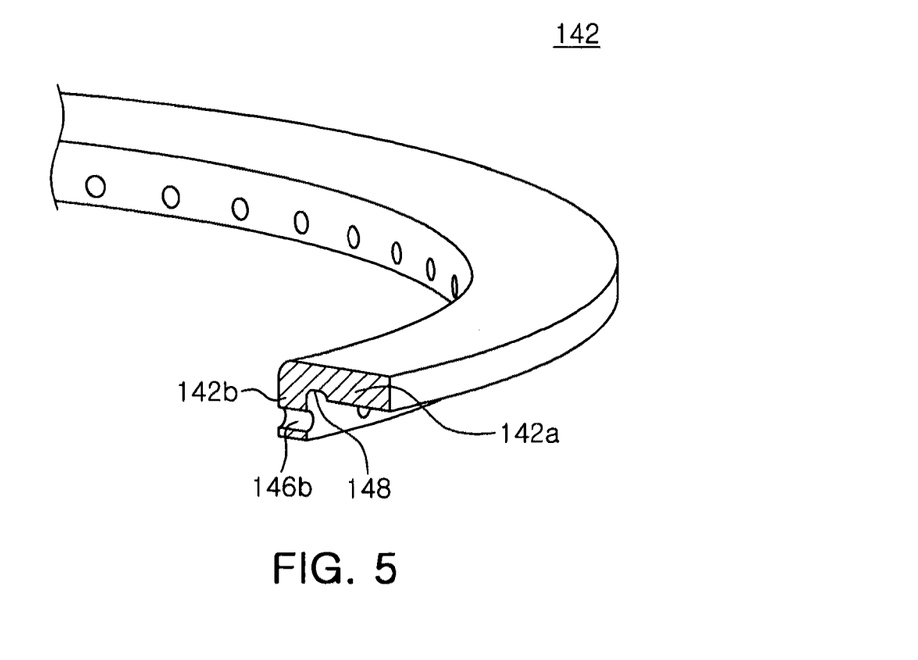

Referring to FIG. 5, an adhesive filling part 146b formed in the extension part 142b of the pulling plate 142 may have the same configuration and effect as those of the adhesive filling part 146a described with reference to FIG. 4, except that it may be formed to penetrate the extension part 142b inwardly of the outer circumferential surface of the extension part 142b in the radial direction.

Therefore, the cross-sectional shape of the adhesive filling part 146b may be modified so long as it has a structure in which the adhesive filling the adhesive filling part 146b may serve as a wedge protruding from the base member 144 to increase the unmating force of the pulling plate 142.

Figure 6:
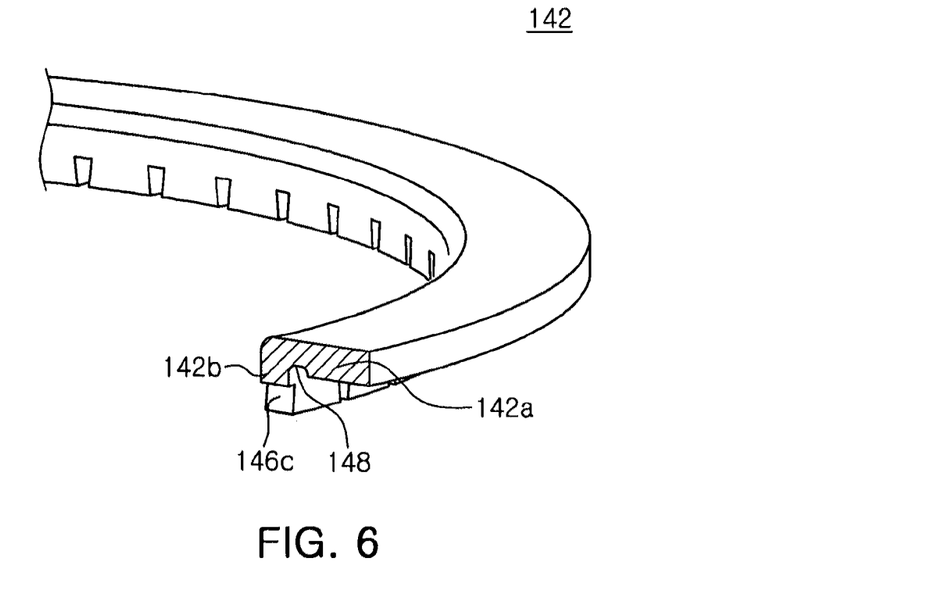

Referring to FIG. 6, an adhesive filling part 146c formed in the extension part 142b of the pulling plate 142 may be formed to penetrate the extension part 142b inwardly of the outer circumferential surface thereof in the radial direction, and may be extended to the lower surface of the extension part 142b.

In this configuration, the adhesive filling part 146c may have a width gradually reduced downwardly of the lower surface of the extension part 142b in the axial direction.

Therefore, since the adhesive filling part 146c has a reduced width, the adhesive filling the adhesive filling part 146 may have a function of a wedge protruding from the base member 144.

However, the adhesive filling part 146c may have a uniform width downwardly of the lower surface of the extension part 142b, and the cross-sectional shape of an upper surface of the adhesive filling part 146c is not limited.

Figure 7:
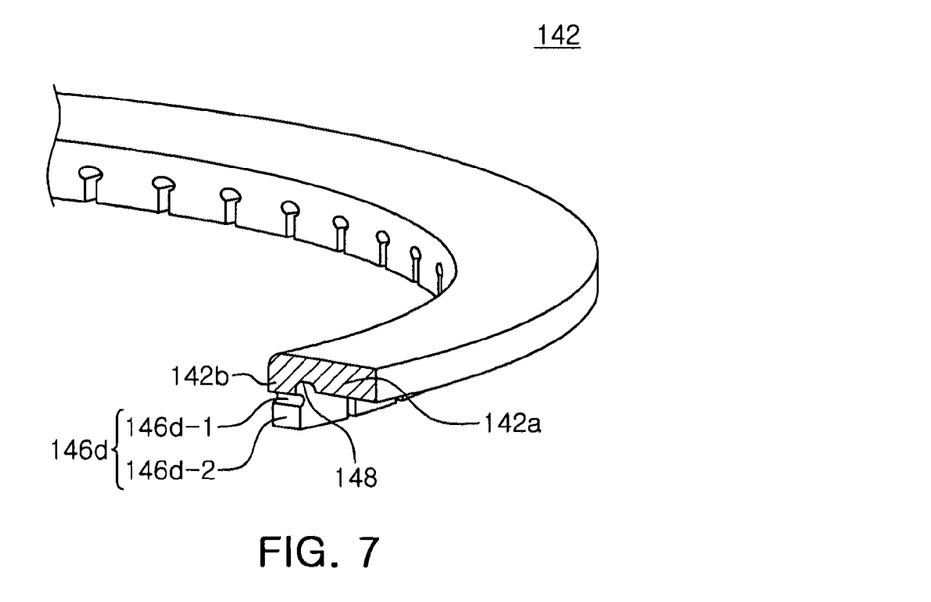

Referring to FIG. 7, an adhesive filling part 146d formed in the extension part 142b of the pulling plate 142 may be formed to penetrate the extension part 142b inwardly of the outer circumferential surface thereof in the radial direction, and may be extended to the lower surface of the extension part 142b.

In this configuration, the adhesive filling part 146d may include a first coupling hole 146d-1 penetrating the upper portion of the extension part 142b and a second coupling hole 146d-2 having a width narrower than that of the first coupling hole 146d-1.

Therefore, the second coupling hole 146d-2 of the adhesive filling part 146d may be extended to the lower surface of the extension part 142b, and may have a gradually reduced width.

The cross-sectional shape of the first coupling hole 146d-1 is not limited; however, the first coupling hole 146-1 may have a width larger than that of the second coupling hole 146d-2 in order to allow the adhesive filling the adhesive filling part 146d to serve as a wedge protruding from the base member 144.

In this configuration, the cross-sectional shape of the first coupling hole 146d-1 may be any one of a circular shape, an oval shape, a rectangular shape, and a triangular shape; however, the cross-sectional shape of the first coupling hole 146d-1 is not limited thereto.

The position of the first coupling hole 146d-1 is not limited. That is, the first coupling hole 146d-1 may be formed at a border between the first coupling hole 146d-1 and the upper part 142a of the extension part 142b, or may be formed at the center of the extension part 142b.

Figure 8:
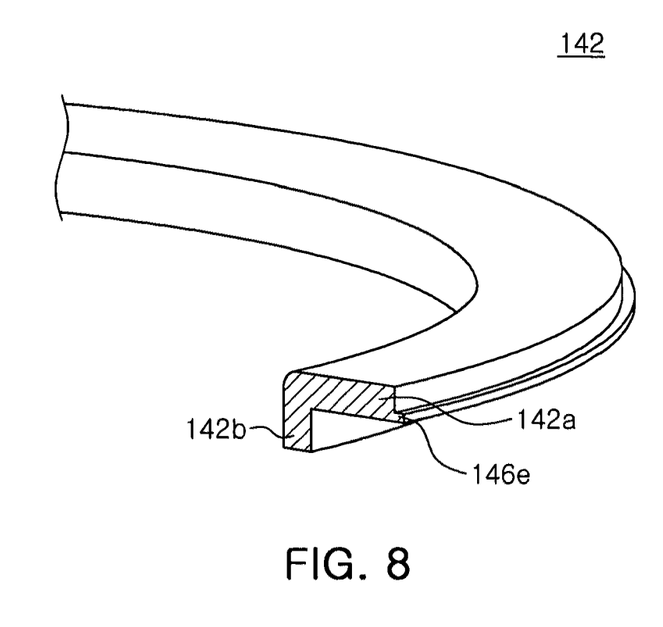

Referring to FIG. 8, the pulling plate 142 may include an adhesive filling part 146e protruding outwardly of one end of the upper part 142a in the radial direction in order to increase the adhesion space for the adhesive.

The adhesive filling part 146e, which is the part bonded to the upper surface of the step part 144a of the base member 144, may increase an area to which the adhesive is applied.

In other words, the adhesive filling part 146e may increase the area to which the adhesive is applied due to a surface area of the protruding part thereof, thereby increasing the unmating force of the pulling plate 142.

In addition, the adhesive filling part 146e may be continuously or discontinuously formed in the circumferential direction along the upper part 142a.

In this configuration, the pulling plate 142 described with reference to FIGS. 4 through 8 may further include the auxiliary adhesive filling part 148 recessed upwardly of the lower surface of the upper part 142a. The auxiliary adhesive filling part 148 may further increase the filling space for the adhesive together with the adhesive filling part 146a to 146e.

The auxiliary adhesive filling part 148 may be continuously or discontinuously formed along the lower surface of the upper part 142a.

As described above, the pulling plate 142 provided in the motor 100 according to the exemplary embodiments of the present invention may include the adhesive filling part 146, 146a to 146e in order to increase the adhesion space for the adhesive, thereby increasing the unmating force thereof.

That is, the adhesive filling the adhesive filling part 146, 146a to 146e may serve as a wedge protruding from the base member 144 to thereby increase the unmating force of the pulling plate 142.

As set forth above, in a base assembly for a motor and a motor including the same according to exemplary embodiments of the present invention, the unmating force of a pulling plate is improved, whereby the excessive floating of the motor may be prevented.

In addition, stable rotation is secured, whereby the performance and lifespan of the motor may be maximized.

While the present invention has been shown and described in connection with the exemplary embodiments, it will be apparent to those skilled in the art that modifications and variations can be made without departing from the spirit and scope of the invention as defined by the appended claims.

What is claimed is:

1. A base assembly for a motor, the base assembly comprising:
    a base member having a shaft system of the motor mounted therein; and
    a pulling plate bonded to the base member to prevent excessive floating of the motor,
    the pulling plate comprising at least one adhesive filling part formed therein and providing an adhesion space for an adhesive used for bonding the pulling plate to the base member to increase a contact area with the adhesive,
    the base member including a step part stepped on one surface thereof corresponding to a magnet generating a rotational driving force of the motor,
    the pulling plate including an upper part bonded to an upper surface of the step part and an extension part extended from an end of the upper part to a side surface of the step part, and
    the adhesive filling part including a first coupling hole, and a second coupling hole having a width narrower than that of the first coupling hole and being extended to the lower surface of the extension part.

2. The base assembly of claim 1, wherein the adhesive filling part is continuously or discontinuously formed along the outer circumferential surface of the extension part.

3. The base assembly of claim 1, wherein the second coupling hole has a gradually reduced width toward the lower surface of the extension part.

4. The base assembly of claim 1, wherein the adhesive filling part protrudes outwardly of one end of the upper part in a radial direction to increase the contact area with the adhesive.

5. The base assembly of claim 1, wherein the upper part includes an auxiliary adhesive filling part recessed upwardly of a lower surface thereof in order to increase adhesion between the pulling plate and the base member by providing a filling space for the adhesive.

6. A motor comprising:
    the base assembly for the motor of claim 1;
    a core coupled to a base member and having a coil wound therearound, the coil generating a rotational driving force; and
    a hub coupled to a shaft system and including a magnet disposed to correspond to the coil.

* * * * *